US005892648A

United States Patent [19]

Bobert et al.

[11] Patent Number: 5,892,648

[45] Date of Patent: Apr. 6, 1999

[54] GAS-FILLED OVERVOLTAGE ARRESTER WITH ELECTRODE ACTIVATION COMPOUND

[75] Inventors: Peter Bobert; Winfried Voelkner; Wolfgang Daeumer; Juergen Boy, all of Berlin, Germany

[73] Assignee: Siemens Aktiengesellschaft, München, Germany

[21] Appl. No.: 906,079

[22] Filed: Aug. 5, 1997

[30] Foreign Application Priority Data

Aug. 5, 1996 [DE] Germany .......................... 196 32 417.3

[51] Int. Cl.[6] .......................... H02H 1/00

[52] U.S. Cl. .......................... 361/120; 361/117

[58] Field of Search .......................... 361/117, 119, 361/120, 121

[56] References Cited

U.S. PATENT DOCUMENTS

| | | | |
|---|---|---|---|
| 4,266,260 | 5/1981 | Lange et al. . | |
| 4,360,757 | 11/1982 | Hahndorff | 313/218 |
| 4,665,337 | 5/1987 | Watzkle et al. | 131/231.11 |
| 4,739,439 | 4/1988 | Boy | 361/120 |
| 4,769,736 | 9/1988 | Boy . | |
| 4,831,485 | 5/1989 | Einbinder | 361/120 |
| 4,924,347 | 5/1990 | Cantagrel | 361/120 |
| 5,336,970 | 8/1994 | Einbinder . | |
| 5,633,777 | 5/1997 | Boy et al. | 361/17 |
| 5,671,114 | 9/1997 | Daumer et al. | 361/129 |

*Primary Examiner*—Richard T. Elms
*Assistant Examiner*—Kim Huynh
*Attorney, Agent, or Firm*—Kenyon & Kenyon

[57] ABSTRACT

A gas-filled overvoltage arrester with an electrode activation compound. In order to ensure a high degree of adherence of the activation compound to the electrodes in a gas-filled hydrogen-containing overvoltage arrester, the activation compound comprises a first aluminum component, a second halide component, and a third dielectric or ferroelectric metal oxide component. These three components are present in the proportions of 50 to 70, 20 to 40, and 3 to 10 mol. %, respectively.

4 Claims, 1 Drawing Sheet

GAS-FILLED OVERVOLTAGE ARRESTER WITH ELECTRODE ACTIVATION COMPOUND

FIELD OF THE INVENTION

The present invention is directed to a gas-filled overvoltage arrester having at least two electrodes, and in particular, to a gas-filled overvoltage arrester in which an electrode activation compound is applied to at least one electrode in order to achieve certain ignition characteristics.

BACKGROUND INFORMATION

In gas-filled overvoltage arresters that use inert gas, the desired operating characteristics (e.g., ignition voltage, response time, static response voltage, and dynamic response voltage) can be influenced in different ways. For example, the operating characteristics of an arrester can be affected by the design of the electrodes, the type and pressure of the gas filling, the arrangement of one or more ignition strips on the inner wall of the glass or ceramic insulator, and the type of activation compound that is applied to the active surfaces of the electrodes.

As an example, U.S. Pat. No. 4,266,260 describes overvoltage arrester that has two electrodes inserted in front into a hollow cylindrical ceramic insulator. The surfaces of the electrodes that face one another are coated with an activation compound consisting of aluminum and magnesium oxide. The activation compound is located in the depressions of the electrode. A plurality of ignition strips, configured as "central ignition strips" without direct connection to the electrodes, also run in the coating on the inner wall of the insulator.

U.S. Pat. No. 4,769,736 describes overvoltage arresters with annular central electrodes, in which the activation compound (in this case sodium silicate) is also placed in depressions of the central electrode.

European Pat. No. 0 138 082 describes an activation compound for gas-filled overvoltage arresters. An activation compound described therein comprises a plurality of components, including predominantly an alkali halide such as potassium chloride, as well as an alloy in the form of barium-aluminum, and a pure metal in the form of tungsten and/or molybdenum. Nickel can also be added as a fourth, also pure, metallic component. German Pat. No. 29 14 836 describes a similar compound that includes barium-aluminum, titanium, and an alkali halide such a potassium bromide, potassium chloride, or potassium iodide. U.S. Pat. No. 5,336,970 describes another multiple component activation compound consisting of titanium, barium titanate, and glass, with the glass component consisting of a mixture of a plurality of oxides. Other known activation compounds contain, for example, pure aluminum and a barium-aluminum alloy (U.S. Pat. No. 4,831,485), or potassium and/or sodium bromide (German Pat. No. 25 08 183) or pure silver or a eutectic aluminum-silver or aluminum-copper alloy (European Pat. 0 242 688 and U.S. Pat. No. 4,739,439) or barium, titanium and titanium oxide, where barium titanate is decomposed into these components through heat treatment. This latter activation compound is provided for overvoltage arresters whose gas filling consists of argon to which hydrogen has been added (German Pat. No. 31 06 763).

SUMMARY OF THE INVENTION

An object of the present invention is to provide an activation compound having a high degree of adherence to the electrodes of an overvoltage arrester in order to withstand a durability test at the required lower response voltage (≦500 V at 100 V/μs) provided for special high-stress discharge paths. This test consists of unipolar pulses with 1000×500 A, 10/1000 μs waves. Three-electrode overvoltage arresters of the highest performance class (maximum duty), provided, for example, for arrester currents of approximately 200 A (11 cycles at 60 Hz) simultaneously over both arrester paths, must withstand such a durability test. (See U.S. Pat. No. 5,633,777).

In order to achieve this object, the present invention provides that, when using a hydrogen-containing gas filling, the first component consists of aluminum present in amounts of 50 to 70 mol. %, the second component consists of an alkali or alkali earth halide or a mixture of alkali or alkali earth halides present in amounts of 20 to 40 mol.%, and the third component consists of a metal oxide with dielectric or ferroelectric properties and present in amounts of 3 to 10 mol. %.

When such a combination of activation compound components is used, the actual ignition and extinction characteristics of the overvoltage arrester are basically ensured by the second and third components, while the first component prevents the activation compound from forming melt beads at high arrester current loads; such melt beads may result in a change in the electrode gap, which would in turn change the ignition characteristics. The hydrogen portion of the gas filling, on the other hand, provides the required low response voltage.

The selection of special halides of the second component depends on the particular extinction requirements. In addition to potassium bromide or sodium bromide used as preferred components, chlorides, iodides, or fluorides may also be considered.

The third component used according to the present invention provides high performance on the cathode side; that is, it prevents premature depletion of the activation compound on the cathode side and thus premature ignition failures. In addition to the preferentially used barium titanate ($BaTiO_3$), titanium oxide ($TiO_2$) or lithium niobate ($LiNbO_3$) may also be considered.

The electrode activation compound of the present invention is applicable to the highest performance class of three-electrode arresters having a hollow cylindrical central electrode. Since such electrodes cannot be provided with a honeycomb structure (as is common in cylindrical end electrodes) for the activation compound, the present invention applies the electrode activation compound in a groove around the inner cylindrical surface.

BRIEF DESCRIPTION OF THE DRAWING

The drawing shows a discharge path configured according to the present invention in the form of a three-electrode overvoltage arrester.

DETAILED DESCRIPTION

Figure 1:
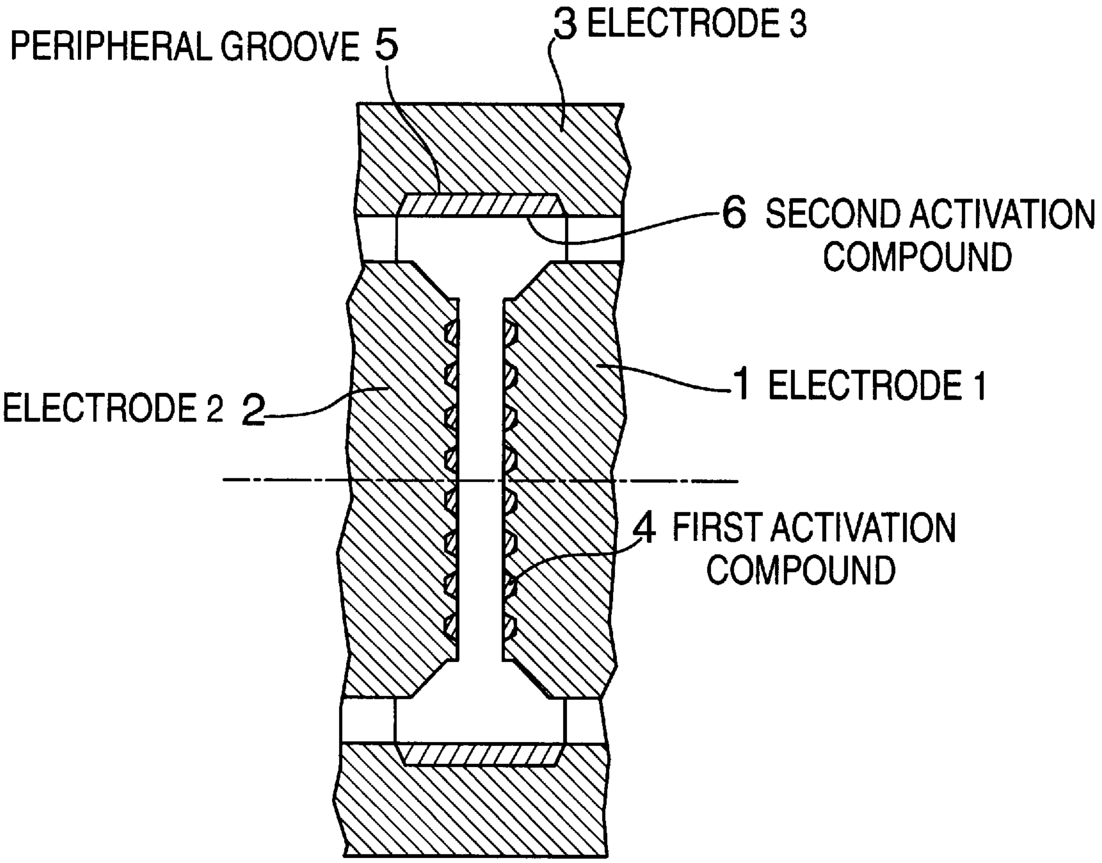

The figure shows a section of an actual discharge area located between two end electrodes 1 and 2 axially facing one another on the one side and the hollow cylindrical central electrode 3, concentric to end electrodes 1 and 2, on the other side. The faces of end electrodes 1 and 2 are provided with a honeycomb structure, to which a first electrode activation compound 4 is applied. A second electrode activation compound 6 is applied in the peripheral groove 5 on the inner surface of central electrode 3. The second electrode activation compound 6 consists of 60 mol. % aluminum, 30 mol. % sodium bromide, and 7 mol. % barium titanate. The first two components may vary plus or minus 10 mol. %, and the third component may vary plus or minus 3 mol. %. Recalculated into percentage by weight, the activation compound 6 consists of approximately 25 wt. % aluminum, approx. 50 wt. % sodium bromide, and approx. 25 wt. % barium titanate.

The first activation compound 4 may be identical to the second activation compound 6. However, it is convenient to use activation compounds without the component aluminum, such as, for example, a compound with the components alkali silicate or alkali earth silicate, alkali halide or alkali earth halide, and nickel. Both activation compounds must be compatible with hydrogen, since the gas filling of the overvoltage arrester has 5 to 20 vol. % hydrogen in addition to an inert gas such as argon in order to provide a low response voltage.

What is claimed is:

1. A gas-filled overvoltage arrester, comprising:

a first electrode; and a second electrode, wherein:

an electrode activation compound is applied to a surface of at least one of the first electrode and the second electrode, the electrode activation compound comprising a plurality of components, a first component of the electrode activation compound comprises aluminum and is present in the electrode activation compound in an amount of 50 to 70 mol. %, a second component of the electrode activation compound comprises one of an alkali halide, an alkaline earth halide, and a mixture of an alkali halide and an alkaline earth halide, the second component being present in the electrode activation compound in an amount of 20 to 40 mol. %, and a third component of the electrode activation compound comprises a metal oxide having one of a dielectric and a ferroelectric property, the third component being present in the electrode activation compound in an amount of 3 to 10 mol. %; and wherein the gas comprises hydrogen.

2. The gas-filled overvoltage arrester according to claim 1, wherein the second component comprises one of potassium bromide and sodium bromide.

3. The gas-filled overvoltage arrester according to claim 1, wherein the third component comprises one of barium titanate, titanium oxide, and lithium niobate.

4. The gas-filled overvoltage arrester according to claim 1, wherein the electrode activation compound comprises 60±10 mol. % aluminum, 30±10 mol. % sodium bromide, and 7±3 mol. % barium titanate.

* * * * *